United States Patent Office 3,206,484
Patented Sept. 14, 1965

3,206,484
10-SUBSTITUTED PREGNANE DERIVATIVES
Alexander D. Cross, Mexico City, Mexico, assignor to Syntex Corporation, Panama, Panama, a corporation of Panama
No Drawing. Filed Dec. 23, 1963, Ser. No. 332,965
Claims priority, application Mexico, Sept. 2, 1963, 73,693
22 Claims. (Cl. 260—397.1)

The present invention relates to novel cyclopentanophenanthrene derivatives and to a process for the preparation thereof.

More particularly the present invention relates to novel $10\alpha$ and $10\beta$ derivatives of 19-nor-5α-pregnen-17α-ol-2,20-dione, to their 6α-methyl and/or 16α or 16β-methyl derivatives, as well as to the corresponding 11β-hydroxy or 11-keto and/or 21-hydroxy derivatives, and further to the respective C-17 and C-21 esters.

The novel compounds of the present invention are represented by the following formulae:

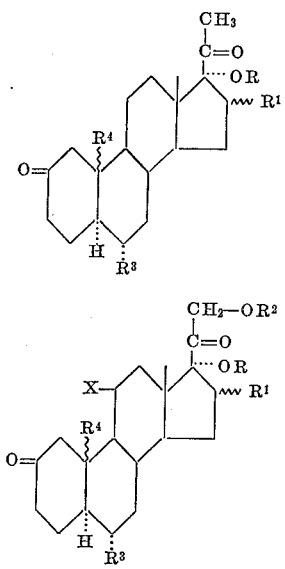

In the above formulae R and $R^2$ each represent hydrogen or a hydrocarbon carboxylic acyl group of less than 12 carbon atoms; $R^1$ represents hydrogen, α-methyl or β-methyl; $R^3$ represents hydrogen or methyl; X represents hydrogen, a keto group or a β-hydroxy group; and $R^4$ represents a methyl radical (–$CH_3$), a cyano radical (–CN), a dicarbethoxymethyl grouping $$[-CH-(COOEt)_2]$$

an ethinyl radical (–C≡CH), an acetonyl radical or a β-cyanoethyl radical $$(-\overset{\alpha}{C}H_2-\overset{\beta}{C}H_2-CN)$$

all of them may have α or β-configuration at C-10 of the 19-nor-pregnane molecule.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, pheoxyacetate, cyclopentylpropionate, aminoacetate, and β-chloropropionate.

The compounds represented by formula A are progestational compounds with oral activity, useful in fertility control and they also exhibit anti-estrogenic and anti-gonadotrophic activity. In addition, they lower the blood and adrenal cholesterol levels.

The compounds represented by formula B have anti-inflammatory properties and glycogen cummulative activity. In addition, they reduce the thymus and are anti-estrogenic and anti-gonadotrophic hormones which are used as anti-arthritic and anti-rheumatic agents.

The novel compounds of the present invention are prepared by the process exemplified by the following equation:

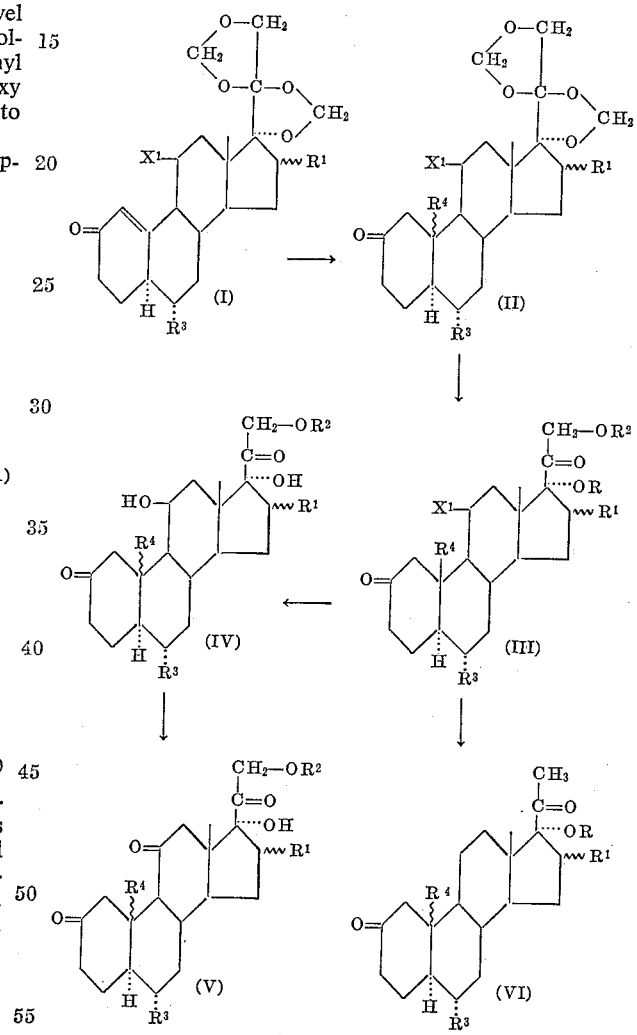

In the above formulae R, $R^1$, $R^2$, $R^3$ and $R^4$ have the same meaning as previously set forth. The wavy lines in positions C-10 and C-16 indicate that the substituent attached to that position may have α or β-orientation with respect to the steroidal nucleus; and $X^1$ represents hydrogen or a free β-hydroxyl group.

In carrying out the process outlined above, the starting compound which is a 17,20;20,21-bismethylenedioxy-19-nor-$\Delta^{1(10)}$-5α-pregnen-2-one derivative (I;$X^1$=hydrogen) (prepared according to my U.S. patent application Serial No. 332,963, filed of even date) or the corresponding 11β-hydroxyl derivative (I;$X^1$=β-OH) which is obtained from the corresponding 19-nor-$\Delta^{1(10)}$-5α-pregnene-11β, 17α,21-triol-2,20-dione 21-acetate (also described in the aforesaid patent application) firstly by conventional saponification of the ester group at C-21 and subsequent formation of the respective 17,20;20,21-bismethylene-dioxy-derivative by reaction with formaldehyde, in the presence of an acid catalyst such as hydrochloric acid, is treated with a methyl magnesium halide, preferably methyl magnesium bromide, in a suitable solvent inert to the Grignard reagent such as tetrahydrofuran and in the presence of cuprous chloride, thus giving the respective 10α-methyl-17,20;20,21 - bismethylenedioxy-19-nor-5α-pregnan-2-one as well as the corresponding 10β-methyl-isomer (II; $R^4=$—$CH^3$).

In order to obtain the (10α or β) cyano steroid derivatives of the present invention, the aforesaid starting compound is treated with a cyanide of an alkali metal, such as potassium cyanide, dissolved in a hydroxylated organic solvent, as for example ethanol, and preferably at reflux temperature, thus giving the corresponding 10α-cyano-17,20;20,21-bismethylenedioxy-19-nor-5α-pregnan-20-one derivative and the respective 10β-cyano isomer (II; $R^4=$—CN)

When preparing the 10α or 10β-dicarbethoxymethyl derivatives of 19-nor-pregnane, the starting $\Delta^{1(10)}$-2-keto steroidal compound (I) is treated under anhydrous conditions with diethyl malonate in an organic solvent inert to this reagent, preferably ethanol, and in the presence of a suitable basic catalyst, such as for example sodium ethoxide, to produce the corresponding 10α-dicarbethoxymethyl - 17,20;20,21-bismethylenedioxy - 19-nor-5α-pregnan-2-one derivative together with the respective 10β-isomer [II; $R^4=$—CH—$(COOEt)_2$].

In order to obtain the 10α or 10β-ethinyl derivatives of the present invention the starting compound (I) is reacted with a metal acetylide, preferably lithium acetylide, in a solvent inert to the organometal reagent, such as tetrahydrofuran, to give the corresponding 10α-ethinyl-17,20;20,21 - bismethylenedioxy-19-nor-5α-pregnan-2-one derivative and the respective 10β-ethinyl-isomer (II; $R^4=$—C≡CH)

Upon treatment of the starting compound (I) with dimethylketone in the presence of a basic catalyst, such as piperidine, there are obtained the corresponding 10α-acetonyl-17,20;20,21-bismethylenedioxy-5α-pregnan-2-one derivative and the respective 10β-isomer. Following the same procedure but substituting dimethyl-ketone by acrylonitrile and using as basic catalyst preferably benzyl-trimethyl ammonium hydroxide (Triton B), in an inert solvent, such as dioxane, there are obtained the corresponding 10α-(β-cyanoethyl) - 17,21;20,21-bismethylenedioxy-19-nor-5α-pregnan-2-one derivative and the corresponding 10β-isomer (II; $R^4=CH_2CH_2$—CN).

In all of the above reactions, the 10α and 10β-isomers may be separated by conventional methods, such as chromatography or fractional crystallization.

In accordance with the above equation, the 10α- or 10β-substituted 17,20;20,21-bismethylenedioxy-19-nor-5α-pregnan-2-one (II) is hydrolyzed by conventional methods, preferably with an acid under mild conditions, such as formic acid, thus producing the corresponding 10α or 10β-substituted 19 - nor - 5α-pregnane - 17α,21 - diol-2,20-dione (III; $X^1$, R and R2=H) or 19-nor-5α-pregnane-11β,17α,21-triol-2,20-dione compounds (III; $X^1=β$-OH; R and R2=H).

Conventional treatment of the latter steroid derivatives with an acid anhydride derived from a hydrocarbon carboxylic acid of less than 12 carbon atoms, in the presence of pyridine, produces the respective C-21 acylates of the 10α or 10β-substituted 19-nor-5α-pregnane-17α,21-diol-2,20-dione (III; $X^1$ and R=H; R2=acyl) and 19-nor-5α-pregnane - 11β,17α,21-triol-2,20-dione derivatives (III; $X^1=$—OH; R=H; R2=acyl). Conventional esterification of the free hydroxyl group at C-17α of the first mentioned C-21 esters (III; $X^1$ and R1=H; R2=acyl) with a hydrocarbon carboxylic acid anhydride of the above described type (which hydrocarbon chain may be the same or different to that of the acyl radical previously attached to C-21), and in the presence of p-toluenesulfonic acid, produces the corresponding C-17, C-21 diacylates of the 10α or 10β-substituted 19-nor-5α-pregnane-17α,21-diol-2,21-dione compounds (III; $X^1=$H; $R^1$ and R2=acyl).

Alternatively, upon incubatioin of the 10α or 10β-substituted 19-nor-5α-pregnane - 17α,21-diol - 2,20-dione (III; $X^1$, R and R2=H) derivatives with adrenal glands in a suitable medium, for example an aqueous solution of alkali metal phosphates and chlorides together with magnesium sulfate, mixed with an aqueous solution of fumaric acid and sodium hydroxide, for a period of time of the order of 3 hours, at a temperature of around 28–37° C., there are produced the corresponding 10α or 10β-substituted 19-nor-5α-pregnane - 11β,17α,21-triol-2,20-dione derivatives (IV; R2=H), which are subsequently esterified conventionally at C-21 and oxidized, preferably with Jones reagent, to produce the corresponding C-21 acylates of the 10α or 10β-substituted 19-nor-5α-pregnane-17α,21-diol-2,11,20-trione (V; R2=acyl).

The elimination of the 21-hydroxy group of the 10α or 10β - substituted 19 - nor - 5α-pregnan-17α,21-diol-2,20-dione derivatives (III; $X^1$, R and R2=H) is carried out by treatment with tosyl chloride in pyridine solution to give the corresponding C-21 tosylates, which upon subsequent detosylation by treatment with potassium iodide in acetic acid produces the corresponding 10α or 10β-substituted 19 - nor-5α-pregnan-17α-ol-2,20-dione derivative (VI; R=H). Conventional acylation of these compounds with a suitable acylating agent, such as an acid anhydride derived from a hydrocarbon carboxylic acid of less than 12 carbon atoms and in the presence of p-toluenesulfonic acid produces the corresponding 10α or 10β - substituted 19 - nor - 5α - pregnan-17α-ol-2,20-dione C-17-acylate (VI; R=acyl).

The following specific examples serve to illustrate the present invention but are not intended to limit it.

PREPARATION 1

2 grams of the 21-acetate of 6α,16α-dimethyl-19-nor-$\Delta^{1(10)}$-5α-pregnene-11β,17α,21-triol-2,20-dione were dissolved in 50 cc. of methanol and treated with 5 cc. of a 4% aqueous solution of potassium hydroxide; the reacting mixture was stirred at 0° C. during 1 hour under a nitrogen atmosphere; the mixture was neutralized with acetic acid and the methanol was distilled under reduced pressure. The residue was triturated with water, the solid filtered off, washed with water, dried and recrystallized from ethyl acetate-methanol, to produce 6α,16α-dimethyl-19-nor-$\Delta^{1(10)}$-5α-pregnene-11β,17α,21-triol-2,20-dione.

Following the same technique, there were treated the starting compounds listed under I to give the corresponding products set forth under II:

| I | II |
|---|---|
| 21-acetate of 6α, 16β-dimethyl-19-nor-$\Delta^{1(10)}$-5α-pregnene-11β, 17α, 21-triol-2, 20-dione. | 6α, 16β-dimethyl-19-nor-$\Delta^{1(10)}$-5α-pregnene-11β, 17α, 21-triol-2, 20-dione. |
| 21-acetate of 16β-methyl-19-nor-$\Delta^{1(10)}$-5α-pregnene-11β,17α,21-triol-2,20-dione. | 16β-methyl-19-nor-$\Delta^{1(10)}$-5α-pregnene-11β,17α,21-triol-2,20-dione. |
| 21-acetate of 19-nor-$\Delta^{1(10)}$-5α-pregnene-11β, 17α, 21-triol-2,20-dione. | 19-nor-$\Delta^{1(10)}$-5α-pregnene-11β, 17α, 21-triol-2,20-dione. |
| 21-acetate of 16α-methyl-19-nor-$\Delta^{1(10)}$-5α-pregnene-11β,17α,21-triol-2,20-dione. | 16α-methyl-19-nor-$\Delta^{1(10)}$-5α-pregnene-11β,17α,21-triol-2,20-dione. |
| 21-acetate of 6α-methyl-19-nor-$\Delta^{1(10)}$-5α-pregnene-11β,17α,21-triol-2,20-dione. | 6α-methyl-19-nor-$\Delta^{1(10)}$-5α-pregnene-11β,17α,21-triol-2,20-dione. |

PREPARATION 2

To a solution of 2 g. of 6α,16α-dimethyl-19-nor-$\Delta^{1(10)}$-5α - pregnene - 11β,17α,21 - triol - 2,20 - dione in 80 cc. of chloroform were added 10 cc. of a 37% aqueous solution of formaldehyde and 2 cc. of concentrated hydrochloric acid and the mixture was stirred during 48 hours at room temperature. The two layers were separated; the aqueous layer washed with chloroform and the organic solutions were combined and washed with water to neutral, dried over anhydrous sodium sulfate and evaporated to dryness. The residue was recrystallized from methanol-ether thus producting 6α, 16α-dimethyl-17,20;20,21-bismethylenedioxy-19-nor-Δ$^{1(10)}$-5α-pregnene-11β-ol-2-one.

The starting compounds listed below were treated according to the same procedure, to give the respective products hereinafter set forth.

| Starting Compounds | Products |
|---|---|
| 6α,16β-dimethyl-19-nor-Δ$^{1(10)}$-5α-pregnene-11β,17α,21-triol-2,20-dione. | 6α,16β-dimethyl-17,20;20,21-bismethylenedioxy-19-nor-Δ$^{1(10)}$-5α-pregnen-11β-ol-2-one. |
| 16β-methyl-19-nor-Δ$^{1(10)}$-5α-pregnene-11β,17α,21-triol-2,20-dione. | 16β-methyl-17,20;20,21-bismethylenedioxy-19-nor-Δ$^{1(10)}$-5α-pregnen-11β-ol-2-one. |
| 19-nor-Δ$^{1(10)}$-5α-pregnene-11β,17α,21-triol-2,20-dione. | 17,20;20,21-bismethylenedioxy-19-nor-Δ$^{1(10)}$-5α-pregnen-11β-ol-2-one. |
| 16α-methyl-19-nor-Δ$^{1(10)}$-5α-pregnene-11β,17α,21-triol-2,20-dione. | 16α-methyl-17,20;20,21-bismethylenedioxy-19-nor-Δ$^{1(10)}$-5α-pregnen-11β-ol-2-one. |
| 6α-methyl-19-nor-Δ$^{1(10)}$-5α-pregnene-11β,17α,21-triol-2,20-dione. | 6α-methyl-17,20;20,21-bismethylenedioxy-19-nor-Δ$^{1(10)}$-5α-pregnen-11β-ol-2-one. |

*Example I*

To a mixture of 1 g. of 6α,16α-dimethyl-17,20;20,21-bismethylenedioxy - 19-nor-Δ$^{1(10)}$-5α-pregnen-2-one (Cpd. No. 1) (prepared according to my copending U.S. patent application Serial No. 332,963 filed of even date), 1 g. of cuprous chloride and 30 cc. of anhydrous tetrayhdrofuran was added, while stirring and cooling, 30 cc. of tetrahydrofuran, containing 3 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressures gave a residue, which was purified by successive crystallization from methylene chloride-hexane to produce 6α,10α,16α-trimethyl-17,20;20,21-bismethylenedioxy-19-nor-5α-pregnen-2-one (Cpd. No. 2) and the corresponding 10β-isomeric compound.

The starting compounds listed below were treated by the same procedure to give the corresponding 10α-substituted products set forth hereinafter, together with each one of the corresponding 10β-isomers which could be isolated from the obtained mixture in each case, by the use of fractional crystallization or conventional chromatography methods:

*Example II*

5 g. of 6α,16α-dimethyl-17,20:20,21-bismethylenedioxy-19-nor-Δ$^{1(10)}$-5α-pregnen-2-one (Cpd. No. 1) were mixed with 8 g. of potassium cyanide in 200 cc. of ethanol and then the obtained mixture was heated under reflux during 10 hours. It was cooled, diluted with water and the produce of the reaction extracted with ethyl acetate. The organic extract was washed with water, dried over anhydrous sodium sulfate and the solvent distilled off.

The obtained residue was chromatographed on a column having 250 g. of neutral alumina and from the fractions eluted with benzene ether (1:1) there was obtained 10α - cyano-6α,16α-dimethyl-17,20;20,21 - bismethylenedioxy-19-nor-5α-pregnen-2-one (Cpd. No. 25), and from the fractions eluted with a benzene-ether (1:2) was isolated the corresponding 10β-isomer which was found in a smaller proportion than the 10α-isomer.

Following exactly the above technique, there were treated the starting compounds Nos. 3 to 13, inclusive, set forth in Example I to give the corresponding 10α-substituted products set forth hereinafter each together with the respective 10β-isomer which was separated in each case using the procedures mentioned in said example.

Cpd No.: Obtained products
26. 10α-cyano-6α,16β-dimethyl-17,20:20,21-bismethylenedioxy-19-nor-5α-pregnan-2-one.
27. 10α-cyano-16β-methyl-17,20:20,21-bismethylenedioxy-19-nor-5α-pregnan-2-one.
28. 10α-cyano-17,20;20,21-bismethylenedioxy-19-nor-5α-pregnan-2-one.
29. 10α-cyano-16α-methyl-17,20;20,21-bismethylenedioxy-19-nor-5α-pregnan-2-one.
30. 10α-cyano-6α-methyl-17,20;20,21-bismethylenedioxy-19-nor-5α-pregnan-2-one.
31. 10α-cyano-6α,16α-dimethyl-17,20;20,21-bismethylenedioxy-19-nor-5α-pregnan-11β-ol-2-one.
32. 10α-cyano-6α,16β-dimethyl-17,20;20,21-bismethylenedioxy-19-nor-5α-pregnan-11β-ol-2-one.
33. 10α-cyano-16β-methyl-17,20;20,21-bismethylenedioxy-19-nor-5α-pregnan-11β-ol-2-one.
34. 10α-cyano-17,20;20,21-bismethylenedioxy-19-nor-5α-pregnan-11β-ol-2-one.
35. 10α-cyano-16α-methyl-17,20;20,21-bismethylenedioxy-19-nor-5α-pregnan-11β-ol-2-one.
36. 10α-cyano-6α-methyl-17,20;20,21-bismethylenedioxy-19-nor-5α-pregnen-11β-ol-2-one.

| Cpd. No. | Starting Compounds | Cpd. No. | Products |
|---|---|---|---|
| 3 | 6α,16β-dimethyl-17,20; 20,21-bismethylenedioxy-19-nor-Δ$^{1(10)}$-5α-pregnen-2-one. | 14 | 6α,10α,16β-trimethyl-17,20;20,21-bismethylenedioxy-19-nor-5α, pregnan-2-one. |
| 4 | 16β-methyl-17,20;20,21-bismethylenedioxy-19-nor-Δ$^{1(10)}$-5α-pregnen-2-one. | 15 | 10α,16β-dimethyl-17,20;20,21-bismethylenedioxy-19-nor-5α-pregnan-2-one. |
| 5 | 17,20;20,21-bismethylenedioxy-19-nor-Δ$^{1(10)}$-5α-pregnen-2-one. | 16 | 10α-methyl-17,20;20,21-bismethylenedioxy-19-nor-5α-pregnan-2-one. |
| 6 | 16α-methyl-17,20;20,21-bismethylenedioxy-19-nor-Δ$^{1(10)}$-5α-pregnen-2-one. | 17 | 10α,16α-dimethyl-17,20;20,21-bismethylenedioxy-19-nor-5α-pregnan-2-one. |
| 7 | 6α-methyl-17,20;20,21-bismethylenedioxy-19-nor-Δ$^{1(10)}$-5α-pregnen-2-one. | 18 | 6α,10α-dimethyl-17,20;20,21-bismethylenedioxy-19-nor-5α-pregnan-2-one. |
| 8 | 6α,16α-dimethyl-17,20;20,21-bismethylenedioxy-19-nor-Δ$^{1(10)}$-5α-pregnen-11β-ol-2-one. | 19 | 6α,10α,16α-trimethyl-17,20;20,21-bismethylenedioxy-19-nor-5α-pregnan-11β-ol-2-one. |
| 9 | 6α,16β-dimethyl-17,20;20,21-bismethylenedioxy-19-nor-Δ$^{1(10)}$-5α-pregnen-11β-ol-2-one. | 20 | 6α,10α,16β-trimethyl-17,20;20,21-bismethylenedioxy-19-nor-5α-pregnan-11β-ol-2-one. |
| 10 | 16β-methyl-17,20;20,21-bismethylenedioxy-19-nor-Δ$^{1(10)}$-5α-pregnen-11β-ol-2-one. | 21 | 10α,16β-dimethyl-17,20;20,21-bismethylenedioxy-19-nor-5α-pregnan-11β-ol-2-one. |
| 11 | 17,20;20,21-bismethylenedioxy-19-nor-Δ$^{1(10)}$-5α-pregnen-11β-ol-2-one. | 22 | 10α-methyl-17,20;20,21-bismethylenedioxy-19-nor-5α-pregnan-11β-ol-2-one. |
| 12 | 16α-methyl-17,20;20,21-bismethylenedioxy-19-nor-Δ$^{1(10)}$-5α-pregnen-11β-ol-2-one. | 23 | 10α,16α-dimethyl-17,20;20,21-bismethylenedioxy-19-nor-5α-pregnan-11β-ol-2-one. |
| 13 | 6α-methyl-17,20;20,21-bismethylenedioxy-19-nor-Δ$^{1(10)}$-5α-pregnen-11β-ol-2-one. | 24 | 6α,10α-dimethyl-17,20;20,21-bismethylenedioxy-19-nor-5α-pregnan-11β-ol-2-one. |

Example III

To a solution of sodium ethoxide in ethanol (prepared from 500 mg. of recently cut sodium in 15 cc. of absolute ethanol) were added 7 cc. of diethyl malonate, freshly distilled, together with 15 g. of 6α,16α-dimethyl-17,20;20,21-bismethylenedioxy-19 - nor - $\Delta^{1(10)}$ - 5α - pregnen-2-one dissolved in 200 cc. of absolute ethanol. The obtained mixture was heated under reflux in a nitrogen atmosphere during 2 hours and was clarified after 15 minutes of having initiated the heat. The solution thus obtained was cooled and poured into a mixture of 380 cc. of water and 20 cc. of acetic acid. The organic product was extracted with ethyl-acetate and the aqueous fractions were extracted two times more with the same solvent (100 cc. each time). The organic extracts were combined washed with a diluted solution of sodium carbonate in water and then washed to neutral with water. The organic layer was dried over anhydrous sodium sulfate and evaporated to dryness under vacuum. The residue was chromatographed on a column prepared with 600 g. of silica-gel and the solid fractions eluted with benzene ether (3–1) produced 10α-dicarbethoxymethyl-6α,16α-dimethyl - 17,20;20,21 - bismethylenedioxy - 19 - nor - 5α-pregnan-2-one (Cpd. No. 37). Further elution with ether gave the corresponding 10β-isomer. The two isomers were recrystallized separately from acetone-hexane to produce the corresponding pure derivatives.

The starting compounds, No. 3 to 13 inclusive, set forth in Example I were treated in an identical manner, to produce the corresponding 10α-substituted derivatives hereinafter set forth, together with the respective 10β-steroid isomers.

Cpd. No.: Produced compounds
38. 10α-(dicarbethoxymethyl)-6α,16β-dimethyl-17,20;20,21-bismethylenedioxy-19-nor-5α-pregnan-2-one.
39. 10α-(dicarbethoxymethyl)-16β-methyl-17,20;20,21-bismethylenedioxy-19-nor-5α-pregnan-2-one.
40. 10α-(dicarbethoxymethyl)-17,20;20,21-bismethylenedioxy-19-nor-5α-pregnan-2-one.
41. 10α-(dicarbethoxymethyl)-16α-methyl-17,20;20,21-bismethylenedioxy-19-nor-5α-pregnan-2-one.
42. 10α-(dicarbethoxymethyl)-6α-methyl-17,20;20,21-bismethylenedioxy-19-nor-5α-pregnan-2-one.
43. 10α-(dicarbethoxymethyl)-6α,16α-dimethyl-17,20;20,21-bismethylenedioxy-19-nor-5α-pregnan-11β-ol-2-one.
44. 10α-(dicarbethoxymethyl)-6α,16β-dimethyl-17,20;20,21-bismethylenedioxy-19-nor-5α-pregnan-11β-ol-2-one.
45. 10α-(dicarbethoxymethyl)-16β-methyl-17,20;20,21-bismethylenedioxy-19-nor-5α-pregnan-11β-ol-2-one.
46. 10α-(dicarbethoxymethyl)-17,20;20,21-bismethylenedioxy-19-nor-5α-pregnan-11β-ol-2-one.
47. 10α-(dicarbethoxymethyl)-16α-methyl-17,20;20,21-bismethylenedioxy-19-nor-5α-pregnan-11β-ol-2-one.
48. 10α-(dicarbethoxymethyl)-6α-methyl-17,20;20,21-bismethylenedioxy-19-nor-5α-pregnan-11β-ol-2-one.

Example IV

There was passed a slow current of purified acetylene through a suspension of 1 g. of lithium aluminum hydride in 50 cc. of anhydrous tetrahydrofuran during 3 hours at room temperature and with constant stirring, then there was added dropwise a solution of 1 g. of 6α,16α-dimethyl-17,20;20,21-bismethylenedioxy-19-nor-$\Delta^{1(10)}$-5α - pregnen-2-one in 50 cc. of anhydrous tetrahydrofuran and the reacting mixture was kept during 24 hours under the same conditions, then it was poured into water. The resulting mixture was acidified with a 2 N hydrochloric acid solution and the organic product extracted with ethyl acetate. The extract was washed with water until neutral, dried over anhydrous sodium sulfate and evaporated to dryness. By chromatography of the residue on 150 g. of neutral alumina there was produced 10α-ethinyl-6α,16α-dimethyl-17,20;20,21-bismethylenedioxy - 19 - nor - pregnan-2-one (Cpd. No. 49) and the 10β-ethinyl-isomeric derivative thereof.

Upon applying equally this procedure to the starting compounds Nos. 3 to 13 inclusive, listed in Example I there were obtained the corresponding 10α-ethinyl products indicated hereinafter together with each one of the respective isomeric 10β-substituted derivatives which were separated from the original mixture of the two isomers by the purification technique set forth in said example.

Cpd. No.: Products
50. 10αethinyl-6α,16β-dimethyl-17,20;20,21-bismethylenedioxy-19-nor-5α-pregnan-2-one.
51. 10α-ethinyl-16β-methyl-17,20;20,21-bismethylenedioxy-19-nor-5α-pregnan-2-one.
52. 10α-ethinyl-17,20;20,21-bismethylenedioxy-19-nor-5α-pregnan-2-one.
53. 10α-ethinyl-16α-methyl-17,20;20,21-bismethylenedioxy-19-nor-5α-pregnan-2-one.
54. 10α-ethinyl-6α-methyl-17,20;20,21-bismethylenedioxy-19-nor-5α-pregnan-2-one.
55. 10α-ethinyl-6α,16α-dimethyl-17,20;20,21-bismethylenedioxy-19-nor-5α-pregnan-11β-ol-2-one.
56. 19-ethinyl-6α,16β-dimethyl-17,20;20,21-bismethylenedioxy-19-nor-5α-pregnan-11β-ol-2-one.
57. 10α-ethinyl-16β-methyl-17,20;20,21-bismethylenedioxy-19-nor-5α-pregnan-11β-ol-2-one.
58. 10α-ethinyl-17,20;20,21-bismethylenedioxy-19-nor-5α-pregnan-11β-ol-2-one.
59. 10α-ethinyl-16α-methyl-17,20;20,21-bismethylenedioxy-19-nor-5α-pregnan-11β-ol-2-one.
60. 10α-ethinyl-6α-methyl-17,20;20,21-bismethylenedioxy-19-nor-5α-pregnan-11β-ol-2-one.

Example V

A solution of 5 g. of 6α,16α-dimethyl-17,20;20,21-bismethylenedioxy-19-nor-$\Delta^{1(10)}$-5α-pregnen-2-one in 15 cc. of freshly distilled pyridine and 250 cc. anhydrous acetone, was heated under reflux during 16 hours. The excess of acetone together with the piperidine were eliminated by distillation in vacuo. The obtained organic residue was chromatographed on a column of 250 g. of silica in order to obtain separately 10α-acetonyl-6α,16α-dimethyl - 17,20;20,21 - bismethylenedioxy - 19 - nor - 5α-pregnan-2-one (Cpd. No. 61) (eluted with benzene-ether-mixture 1:1) and the corresponding 10β-isomeric derivative (eluted with benzene-ether-mixture 1:3). Crystallization of these steroid derivatives from acetone-ether separately, gave the products in a pure form.

Following the same technique, there were treated the starting compounds Nos. 3 to 13, inclusive, mentioned in Example I, to produce the corresponding 10α-isomeric products hereinafter described, together with the respective 10β-acetonyl substituted derivatives.

Cpd. No.: Obtained products
62. 10α-acetonyl-6α,16β-dimethyl-17,20;20,21-bismethylenedioxy-19-nor-5α-pregnan-2-one.
63. 10α-acetonyl-16β-methyl-17,20;20,21-bismethylenedioxy-19-nor-5α-pregnan-2-one.
64. 10α-acetonyl-17,20;20,21-bismethylenedioxy-19-nor-5α-pregnan-2-one.
65. 10α-acetonyl-16α-methyl-17,20;20,21-bismethylenedioxy-19-nor-5α-pregnan-2-one.
66. 10α-acetonyl-6α-methyl-17,20;20,21-bis-methylenedioxy-19-nor-5α-pregnan-2-one.
67. 10α-acetonyl-6α,16α-dimethyl-17,20;20,21-bismethylenedioxy-19-nor-5α-pregnan-11β-ol-2-one.

Cpd. No.: Obtained products
68. 10α-acetonyl-6α,16β-dimethyl-17,20;20,21-bis-methylenedioxy-19-nor-5α-pregnan-11β-ol-2-one.
69. 10α-acetonyl-16β-methyl-17,20;20,21-bis-methylenedioxy-19-nor-5α-pregnan-11β-ol-2-one.
70. 10α-acetonyl-17,20;20,21-bismethylenedioxy-19-nor-5α-pregnan-11β-ol-2-one.
71. 10α-acetonyl-16α-methyl-17,20;20,21-bis-methylenedioxy-19-nor-5α-pregnan-11β-ol-2-one.
72. 10α-acetonyl-6α-methyl-17,20;20,21-bis-methylenedioxy-19-nor-5α-pregnan-11β-ol-2-one.

*Example VI*

20 g. of 6α,16α-dimethyl-17,20;20,21-bismethylenedioxy 19-nor-Δ$^{1(10)}$-5α-pregnen-2-one were dissolved in 100 cc. of dioxane together with 3 cc. of a 30% aqueous solution of benzyl tri-methyl ammonium hydroxide (Triton B) and then there were added 8 cc. of acrylonitrile dissolved in 20 cc. of dioxane while maintaining a constant stirring; at the beginning the temperature of the reacting mixture rose to approximately 40° C. Then the stirring was continued at room temperature during two hours, the mixture was acidified with diluted hydrochloric acid and the solvents eliminated by distillation in vacuo. The residue was chromatographed on neutral alumina (500 g.). Elution with benzene-ether (2:1 and 1:1) produced 10α-(β-cyanoethyl)-6α,16α - dimethyl - 17,20:20,21 - bismethylenedioxy-19-nor-5α-pregnan-2-one (Cpd. No. 73) and further elution with benzene-ether (1:3) and ether alone gave the corresponding 10β-cyanomethyl isomeric steroid derivative.

The starting compounds Nos. 3 to 13, inclusive, disclosed in Example I, were treated following the same procedure, to give the corresponding 10α-substituted products hereinafter set forth, each together with the respective 10β-isomer, which were separated from the original mixture, in each case, by fractional crystallization or by conventional chromatography methods.

Cpd. No.: Products
74. 10α-(β-cyanoethyl)-6α,16β-dimethyl-17,20;20,21-bismethylenedioxy-19-nor-5α-pregnan-2-one.
75. 10α-(β-cyanoethyl)-16β-methyl-17,20;20,21-bismethylenedioxy-19-nor-5α-pregnan-2-one.
76. 10α-(β-cyanoethyl)-17,20;20,21-bismethylenedioxy-19-nor-5α-pregnan-2-one.
77. 10α-(β-cyanoethyl)-16α-methyl-17,20;20,21-bismethylenedioxy-19-nor-5α-pregnan-2-one.
78. 10α-(β-cyanoethyl)-6α-methyl-17,20;20,21-bismethylenedixoy-19-nor-5α-pregnan-2-one.
79. 10α-(β-cyanoethyl)-6α,16α-dimethyl-17,20;20,21-bismethylenedioxy-19-nor-5α-pregnan-11β-ol-2-one.
80. 10α-(β-cyanoethyl)-6α,16β-dimethyl-17,20;20,21-bismethylenedioxy-19-nor-5α-pregnan-11β-ol-2-one.
81. 10α-(β-cyanoethyl)-16β-methyl-17,20;20,21-bismethylenedioxy-19-nor-5α-pregnan-11β-ol-2-one.
82. 10α-(β-cyanoethyl)-17,20;20,21-bismethylenedioxy-19-nor-5α-pregnan-11β-ol-2-one.
83. 10α-(β-cyanoethyl)-16α-methyl-17,20;20,21-bismethylenedioxy-19-nor-5α-pregnan-11β-ol-2-one.
84. 10α-(β-cyanoethyl)-6α-methyl-17,20;20,21-bismethylenedioxy-19-nor-5α-pregnan-11β-ol-2-one.

*Example VII*

1 g. of 6α,10α,16α-trimethyl-17,20;20,21-bismethylenedioxy-19-nor-5α-pregnan-2-one (Cpd. No. 2) was heated on the steam bath with 20 cc. of 60% formic acid for 15 minutes, cooled, diluted with water and the precipitate was collected, washed with water, dried, and recrystallized from acetone-hexane, thus affording 6α,10α,16α-trimethyl-19-nor-5α-pregnane-17α,21-diol-2,20-dione (Cpd. No. 85).

The compounds Nos. 14 to 84, inclusive, were reacted in the same manner to give respectively.

Cpd. No.: Products
86. 6α,10α,16β-trimethyl-19-nor-5α-pregnane-17α,21-diol-2,20-dione.
87. 10α,16β-dimethyl-19-nor-5α-pregnan-17α,21-diol-2,20-dione.
88. 10α-methyl-19-nor-5α-pregnane-17α,21-diol-2,20-dione.
89. 10α,16α-dimethyl-19-nor-5α-pregnan-17α,21-diol-2,20-dione.
90. 6α,10α-dimethyl-19-nor-5α-pregnan-17α,21-diol-2,20-dione.
91. 6α,10α,16α-trimethyl-19-nor-5α-pregnane-11β,17α,21-triol-2,20-dione.
92. 6α,10α,16β-trimethyl-19-nor-5α-pregnane-11β,17α,21-triol-2,20-dione.
93. 10α,16β-dimethyl-19-nor-5α-pregnane-11β,17α,21-triol-2,20-dione.
94. 10α-methyl-19-nor-5α-pregnan-11β,17α,21-triol-2,20-dione.
95. 10α,16α-dimethyl-19-nor-5α-pregnane-11β,17α,21-triol-2,20-dione.
96. 6α,10α-dimethyl-19-nor-5α-pregnane-11β,17α,21-triol-2,20-dione.
97. 10α-cyano-6α,16α-dimethyl-19-nor-5α-pregnane-17α,21-diol-2,20-dione.
98. 10α-cyano-6α,16β-dimethyl-19-nor-5α-pregnane-17α,21-diol-2,20-dione.
99. 10α-cyano-16β-methyl-19-nor-5α-pregnane-17α,21-diol-2,20-dione.
100. 10α-cyano-19-nor-5α-pregnane-17α,21-diol-2,20-dione.
101. 10α-cyano-16α-methyl-19-nor-5α-pregnane-17α,21-diol-2,20-dione.
102. 10α-cyano-6α-methyl-19-nor-5α-pregnane-17α,21-diol-2,20-dione
103. 10α-cyano-6α,16α-dimethyl-19-nor-5α-pregnane-11β,17α,21-triol-2,20-dione.
104. 10α-cyano-6α,16β-dimethyl-19-nor-5α-pregnane-11β,17α,21-triol-2,20-dione.
105. 10α-cyano-16β-methyl-19-nor-5α-pregnane-11β,17α,21-triol-2,20-dione.
106. 10α-cyano-19-nor-5α-pregnane-11β,17α,21-triol-2,20-dione.
107. 10α-cyano-16α-methyl-19-nor-5α-pregnane-11β,17α,21-triol-2,20-dione.
108. 10α-cyano-6α-methyl-19-nor-5α-pregnane-11β,17α,21-triol-2,20-dione.
109. 10α-(dicarbethoxymethyl)-6α,16α-dimethyl-19-nor-5α-pregnan-17α,21-diol-2,20-dione.
110. 10α-(dicarbethoxymethyl)-6α,16β-dimethyl-19-nor-5α-pregnan-17α,21-diol-2,20-dione.
111. 10α-(dicarbethoxymethyl)-16β-methyl-19-nor-5α-pregnan-17α,21-diol-2,20-dione.
112. 10α-(dicarbethoxymethyl)-19-nor-5α-pregnan-17α,21-diol-2,20-dione.
113. 10α-(dicarbethoxymethyl)-16α-methyl-19-nor-5α-pregnan-17α,21-diol-2,20-dione.
114. 10α-(dicarbethoxymethyl)-6α-methyl-19-nor-5α-pregnan-17α,21-diol-2,20-dione.
115. 10α-(dicarbethoxymethyl)-6α,16α-dimethyl-19-nor-5α-pregnan-11β,17α,21-triol-2,20-dione.
116. 10α-(dicarbethoxymethyl)-6α,16β-dimethyl-19-nor-5α-pregnane-11β,17α,21-triol-2,20-dione.
117. 10α-(dicarbethoxymethyl)-16β-methyl-19-nor-5α-pregnane-11β,17α,21-triol-2,20-dione.
118. 10α-(dicarbethoxymethyl)-19-nor-5α-pregnane-11β,17α-21-triol-2,20-dione.
119. 10α-(dicarbethoxymethyl)-16α-methyl-19-nor-5α-pregnane-11β,17α,21-triol-2,20-dione.
120. 10α-(dicarbethoxymethyl)-6α-methyl-19-nor-5α-pregnane-11β,17α,21-triol-2,20-dione.
121. 10α-ethinyl-6α,16α-dimethyl-19-nor-5α-pregnane-17α,21-diol-2,20-dione.
122. 10α-ethinyl-6α,16β-dimethyl-19-nor-5α-pregnane-17α,21-diol-2,20-dione.

Cpd. No.: Products 123. 10α-ethinyl-16β-methyl-19-nor-5α-pregnane-17α,21-diol-2,20-dione.
124. 10α-ethinyl-19-nor-5α-pregnane-17α,21-diol-2,20-dione.
125. 10α-ethinyl-16α-methyl-19-nor-5α-pregnane-17α,21-diol-2,20-dione.
126. 10α-thinyl-6α-methyl-19-nor-5α-pregnane-17α,21-diol-2,20-dione.
127. 10α-ethinyl-6α-16α-dimethyl-19-nor-5α-pregnane-11β,17α,21-triol-2,20-dione.
128. 10α-ethinyl-6α,16β-dimethyl-19-nor-5α-pregnane-11β,17α,21-triol-2,20-dione.
129. 10α-ethinyl-16β-methyl-19-nor-5α-pregnane-11β,17α,21-triol-2,20-dione.
130. 10α-ethinyl-19-nor-5α-pregnane-11β,17α,21-triol-2,20-dione.
131. 10α-ethinyl-16α-methyl-19-nor-5α-pregnane-11β,17α,21-triol-2,20-dione.
132. 10α-ethinyl-6α-methyl-19-nor-5α-pregnane-11β,17α,21-triol-2,20-dione.
133. 10α-acetonyl-6α,16α-dimethyl-19-nor-5α-pregnane-17α,21-diol-2,20-dione.
134. 10α-acetonyl-6α,16β-dimethyl-19-nor-5α-pregnane-17α,21-diol-2,20-dione.
135. 10α-acetonyl-16β-methyl-19-nor-5α-pregnane-17α,21-diol-2,20-dione.
136. 10α-acetonyl-19-nor-5α-pregnane-17α,21-diol-2,20-dione.
137. 10α-acetonyl-16α-methyl-19-nor-5α-pregnane-17α,21-diol-2,20-dione.
138. 10α-acetonyl-6α-methyl-19-nor-5α-pregnane-17α,21-diol-2,20-dione.
139. 10α-acetonyl-6α,16α-dimethyl-19-nor-5α-pregnane-11β,17α,21-triol-2,20-dione.
140. 10α-acetonyl-6α,16β-dimethyl-19-nor-5α-pregnane-11β,17α,21-triol-2,20-dione.
141. 10α-acetonyl-16β-methyl-19-nor-5α-pregnane-11β,17α,21-triol-2,20-dione.
142. 10α-acetonyl-19-nor-5α-pregnane-11β,17α,21-triol-2,20-dione.
143. 10α-acetonyl-16α-methyl-19-nor-5α-pregnane-11β,17α,21-triol-2,20-dione.
144. 10α-acetonyl-6α-methyl-19-nor-5α-pregnane-11β,17α,21-triol-2,20-dione.
145. 10α-(β-cyanoethyl)-6α,16α-dimethyl-19-nor-5α-pregnane-17α,21-diol-2,20-dione.
146. 10α-(β-cyanoethyl)-6α,16β-dimethyl-19-nor-5α-pregnane-17α,21-diol-2,20-dione.
147. 10α-(β-cyanoethyl)-16β-methyl-19-nor-5α-pregnane-17α,21-diol-2,20-dione.
148. 10α-(β-cyanoethyl)-19-nor-5α-pregnane-17α,21-diol-2,20-dione.
149. 10α-(β-cyanoethyl)-16α-methyl-19-nor-5α-pregnane-17α,21-diol-2,20-dione.
150. 10α-(β-cyanoethyl)-6α-methyl-19-nor-5α-pregnane-17α,21-diol-2,20-dione.
151. 10α-(β-cyanoethyl)-6α,16α-dimethyl-19-nor-5α-pregnane-11β,17α,21-triol-2,20-dione.
152. 10α-(β-cyanoethyl)-6α,16β-dimethyl-19-nor-5α-pregnane-11β,17α,21-triol-2,20-dione.
153. 10α-(β-cyanoethyl)-16β-methyl-19-nor-5α-pregnane-11β,17α,21-triol-2,20-dione.
154. 10α-(β-cyanoethyl)-19-nor-5α-pregnane-11β,17α,21-triol-2,20-dione.
155. 10α-(β-cyanoethyl)-16α-methyl-19-nor-5α-pregnane-11β,17α,21-triol-2,20-dione.
156. 10α-(β-cyanoethyl)-6α-methyl-19-nor-5α-pregnane-11β,17α,21-triol-2,20-dione.

Following the same procedure there were treated the corresponding 10β-substituted isomers of the starting materials No. 2 and Nos. 14 to 84, inclusive, to produce the 10β-isomeric derivatives of the stated compounds Nos. 85 to 156, inclusive.

Example VIII

A mixture of 1 g. of 6α,10α,16α-trimethyl-19-nor-5α-pregnane-17α,21-diol-2,20-dione (Cpd. No. 85), 8 cc. of pyridine and 4 cc. of acetic anhydride was kept at room temperature overnight, poured into ice water, the formed precipitate was filtered, washed with water and dried. Crystallization from acetone-hexane gave the 21-acetate of 6α,10α,16α-trimethyl-19-nor-5α-pregnane-17α,21-diol-2,20-dione (Cpd. No. 157).

Following the same method, there was treated the corresponding 10β-isomer of compound No. 85, set forth in this Example, to produce the respective 10β-substituted C-21 steroidal acetate.

Example IX

Upon applying the esterification technique of Example VIII to the C-21 free hydroxy compounds Nos. 86 to 156, inclusive, set forth in Example VII, there were obtained the corresponding 10α-substituted steroidal C-21 monoacetates.

In an identical manner, there were treated the corresponding 10β-substituted isomers of the mentioned compounds Nos. 86 to 156, inclusive, to obtain the respective 10β-isomeric steroidal C-21 acetates.

Example X

The compounds Nos. 85 to 156, inclusive, were treated according to Example VIII, except that acetic anhydride was substituted by propionic anhydride, caproic anhydride and cyclopentylpropionic anhydride, to obtain the corresponding C-21-propionates, C-21-caproates, and C-21-cyclopentylpropionates of the aforesaid compounds.

The same esterification technique was followed but the steroidal starting materials were the corresponding 10β-substituted isomers of compounds Nos. 85 to 156, inclusive, to give the aforesaid C-21-esters of the respective 10β-substituted isomers.

Example XI

To a solution of 5 g. of the 21-acetate of 6α,10α,16α-trimethyl-19-nor-5α-pregnane-17α,21-diol-2,20-dione (Cpd. No. 157) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the diacetate of 6α,10α,16α-trimethyl-19-nor-5α-pregnane-17α,21-diol-2,20-dione (Cpd. No. 158).

Following the same method there was treated the corresponding 10β-isomer of Cpd. No. 157, previously set forth, to produce the respective 10β-substituted, 17,21-steroidal diacetate.

Example XII

Upon applying the esterification technique of Example XI to the corresponding 10α-substituted 11-desoxy steroidal C-21-monoacetates, obtained according with Example IX there were produced the respective 11-desoxy-17,20-diacetates of the 10α-substituted steroidal compounds.

In an identical manner there were treated the corresponding 11-desoxy-10β-substituted steroidal C-21-monoacetates (obtained in accordance with Example IX) to give the respective 11-desoxy-17,21-diacetates of the corresponding 10β-substituted steroidal compounds.

Example XIII

The 10α and 10β-substituted 11-desoxy steroidal C-21-monoacetate compounds (obtained according with Examples VIII and IX) were reacted following the technique described in Example XI, except that acetic anhydride was substituted by propionic anhydride, caproic anhydride and cyclopenthylpropionic anhydride to give the corresponding 21-acetate-17-propionates, 21-acetates-17-caproates and 21-acetates-17-cyclopentylpropionates of said compound.

In the same manner there were treated the 11-desoxy-10α and 10β-substituted steroidal C-21-esters, obtained according with Example X, to produce the corresponding steroidal C-17, C-21-diesters.

*Example XIV*

The following solutions "A," "B" and "C" were prepared using distilled water as solvent: solution "A" was prepared by mixing 425 cc. of a 1.742% dipotassic phosplate solution ($K_2HPO_4$) with 75 cc. of 1.38% monosodic phosphate; solution "B" was prepared by diluting a 19.1% magnesium sulfate, to a volume of 5 lt.; solution cc. of a 5.75% potassium chloride solution and 10 cc. of a 19.1% magnesium sulfate, to a volume of 5 lt; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixtures of A, B and C solutions with vigorous stirring. To the mixture there was then added 1 g. of 6α,10α,16α-trimethyl-19-nor-5α-pregnane-17α,21-diol-2,20-dione (Cpd. No. 85) dissolved in 5.35 parts of propyleneglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions eluted with benzene-ethers (70:30) afforded 6α,10α,16α-trimethyl-19-nor-5α-pregnane-11β,17α,21-triol-2,20-dione (Cpd. No. 91), identical to the one obtained in Example VII.

Following the above procedure, there was treated the corresponding 10β-substituted isomer of compound No. 85, described above, to give the respective 10β-substituted-11β,17α,21-trihydroxy steroidal derivative.

In the same manner there were reacted the 11-desoxy-10α-substituted C-17α,C-21-dihydroxy steroidal compounds, obtained according with Example VII to produce the corresponding 10α-substituted-11β,17α,21-trihydroxy steroids, identical to those set forth in that example.

In the same manner there were treated the corresponding 10β-substituted-11-desoxy-C-17α,C-21-dihydroxy steroidal derivatives, obtained in the same Example VII, to give the respective 10β-substituted-11β,17α,21-trihydroxy steroidal compounds, also prepared in that example.

*Example XV*

6α,10α,16α-trimenthyl-19-nor-5α-pregnane-11β,17α,21-triol-2,20-dione (Cpd. No. 91) was esterified following the procedure described in Example VIII to give the 21-acetate of 6α,10α,16α-trimethyl-19-nor-5α-pregnane-11β,17α,21-triol-2,20-dione (Cpd. No. 159).

The esterification technique described in Examples VIII and X was applied to the 11β,17α,21-trihydroxy-10α and 10β-substituted steroidal compounds, obtained according with Example XIV, to produce the corresponding C-21-steroidal esters, identical to those previously prepared in Examples IX and X.

*Example XVI*

A solution of 1 g. of the 21-acetate of 6α,10α,16α-trimethyl-19-nor-5α-pregnane-11β,17α,21-triol-2,20-dione (Cpd. No. 159) in 10 cc. of acetone was cooled to 0° C. and treated under an atmosphere of nitrogen and with stirring with a solution of 8N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave the 21-acetate of 6α,10α,16α-trimethyl-19-nor-5α-pregnane-17α,21-diol-2,11,20-trione (Cpd. No. 160).

Following the same procedure there was treated the corresponding 10β-isomer of the starting compound of this example, to give the corresponding 2,11,20-triketo-20β-substituted pregnane compound.

*Example XVII*

Upon applying the oxidation technique of Example XVI, to the 10α-substituted starting compounds listed hereinafter under I (obtained according to Example IX or XV), there were obtained the corresponding products set forth under II:

| I | Cpd. No. | II |
|---|---|---|
| 21-acetate of 6α, 10α, 16α-trimethyl-19-nor-5α-pregnane-11β, 17α, 21-triol-2,20-dione. | 161 | 21-acetate of 6α, 10α, 16α-trimethyl-19-nor-5α-pregnane-17α,21-diol-2,11,20-trione. |
| 21-acetate of 6α,10α,16β-trimethyl-19-nor-5α-pregnane-11β,17α,21-triol-2,20-dione. | 162 | 21-acetate of 6α,10α,16β-trimethyl-19-nor-5α-pregnane-17α,21-diol-2,11,20-trione. |
| 21-acetate of 10α,16β-dimethyl-19-nor-5α-pregnane-11β,17α,21-triol-2,20-dione. | 163 | 21-acetate of 10α,16β-dimethyl-19-nor-5α-pregnane-17α,21-diol-2,11,20-trione. |
| 21-acetate of 10α-methyl-19-nor-5α-pregnane-11β,17α,21-triol-2,20-dione. | 164 | 21-acetate of 10α-methyl-19-nor-5α-pregnane-17α,21-diol-2,11,20-trione. |
| 21-acetate-10α,16α-dimethyl-19-nor-5α-pregnane-11β,17α,21-triol-2,20-dione. | 165 | 21-acetate of 10α,16α-dimethyl-19-nor-5α-pregnane-17α,21-diol-2,11,20-trione. |
| 21-acetate of 6α,10α-dimethyl-19-nor-5α-pregnane-11β,17α,21-triol-2,20-dione. | 166 | 21-acetate of 6α,10α-dimethyl-19-nor-5α-pregnane-17α,21-diol-2,11,20-trione. |
| 21-acetate of 10α-cyano-6α,16α-dimethyl-19-nor-5α-pregnane-11β,17α,21-triol-2,20-dione. | 167 | 21-acetate of 10α-cyano-6α,16α-dimethyl-19-nor-5α-pregnane-17α,21-diol-2,11,20-trione. |
| 21-acetate of 10α-cyano-6α,16β-dimethyl-19-nor-5α-pregnane-11β,17α,21-triol-2,20-dione. | 168 | 21-acetate of 10α-cyano-6α,16β-dimethyl-19-nor-5α-pregnane-17α,21-diol-2,11,20-trione. |
| 21-acetate of 10α-cyano-16β-methyl-19-nor-5α-pregnane-11β,17α,21-triol-2,20-dione. | 169 | 21-acetate of 10α-cyano-16β-methyl-19-nor-5α-pregnane-17α,21-diol-2,11,20-trione. |
| 21-acetate of 10α-cyano-19-nor-5α-pregnane-11β,17α,21-triol-2,20-dione. | 170 | 21-acetate of 10α-cyano-19-nor-5α-pregnane-17α,21-diol-2,11,20-trione. |
| 21-acetate of 10α-cyano-16α-methyl-19-nor-5α-pregnane-11β,17α,21-triol-2,20-dione. | 171 | 21-acetate of 10α-cyano-16α-methyl-19-nor-5α-pregnane-17α,21-diol-2,11,20-trione. |
| 21-acetate of 10α-cyano-6α-methyl-19-nor-5α-pregnane-11β,17α,21-triol-2,20-dione. | 172 | 21-acetate of 10α-cyano-6α-methyl-19-nor-5α-pregnane-17α,21-diol-2,11,20-trione. |
| 21-acetate of 10α-(dicarbethoxymethyl)-6α,16α-dimethyl-19-nor-5α-pregnane-11β,17α,21-triol-2,20-dione. | 173 | 21-acetate of 10α-(dicarbethoxymethyl)-6α,16α-dimethyl-19-nor-5α-pregnane-17α,21-diol-2,11,20-trione. |
| 21-acetate of 10α-(dicarbethoxymethyl)-6α,16β-dimethyl-19-nor-5α-pregnane-11β,17α,21-triol-2,20-dione. | 174 | 21-acetate of 10α-(dicarbethoxymethyl)-6α,16β-dimethyl-19-nor-5α-pregnane-17α,21-diol-2,11,20-trione. |
| 21-acetate of 10α-(dicarbethoxymethyl)-16β-methyl-19-nor-5α-pregnane-11β,17α,21-triol-2,20-dione. | 175 | 21-acetate of 10α-(dicarbethoxymethyl)-16β-methyl-19-nor-5α-pregnane-17α,21-diol-2,11,20-trione. |
| 21-acetate of 10α-(dicarbethoxymethyl)-19-nor-5α-pregnane-11β,17α,21-triol-2,20-dione. | 176 | 21-acetate of 10α-(dicarbethoxymethyl)-19-nor-5α-pregnane-17α,21-diol-2,11,20-trione. |
| 21-acetate of 10α-(dicarbethoxymethyl)-16α-methyl-19-nor-5α-pregnane-11β,17α,21-triol-2,20-dione. | 177 | 21-acetate of 10α-(dicarbethoxymethyl)-16α-methyl-19-nor-5α-pregnane-17α,21-diol-2,11,20-trione. |
| 21-acetate of 10α-(dicarbethoxymethyl)-6α-methyl-19-nor-5α-pregnane-11β,17α,21-triol-2,20-dione. | 178 | 21-acetate of 10α-(dicarbethoxymethyl)-6α-methyl-19-nor-5α-pregnane-17α,21-diol-2,11,20-trione. |
| 21-acetate of 10α-ethinyl-6α,16α-dimethyl-19-nor-5α-pregnane-11β,17α,21-triol-2,20-dione. | 179 | 21-acetate of 10α-ethinyl-6α,16α-dimethyl-19-nor-5α-pregnane-17α,21-diol-2,11,20-trione. |
| 21-acetate of 10α-ethinyl-6α,16β-dimethyl-19-nor-5α-pregnane-11β,17α,21-triol-2,20-dione. | 180 | 21-acetate of 10α-ethinyl-6α,16β-dimethyl-19-nor-5α-pregnane-17α,21-diol-2,11,20-trione. |
| 21-acetate of 10α-ethinyl-16β-methyl-19-nor-5α-pregnane-11β,17α,21-triol-2,20-dione. | 181 | 21-acetate of 10α-ethinyl-16β-methyl-19-nor-5α-pregnane-17α,21-diol-2,11,20-trione. |
| 21-acetate of 10α-ethinyl-19-nor-5α-pregnane-11β,17α,21-triol-2,20-dione. | 182 | 21-acetate of 10α-ethinyl-19-nor-5α-pregnane-17α,21-diol-2,11,20-trione. |

| I | Cpd. No. | II |
|---|---|---|
| 21-acetate of 10α-ethinyl-16α-methyl-19-nor-5α-pregnane-11β,17α,21-triol-2,20-dione. | 183 | 21-acetate of 10α-ethinyl-16α-methyl-19-nor-5α-pregnane-17α,21-diol-2,11,20-trione. |
| 21-acetate of 10α-ethinyl-6α-methyl-19-nor-5α-pregnane-11β,17α,21-triol-2,20-dione. | 184 | 21-acetate of 10α-ethinyl-6α-methyl-19-nor-5α-pregnane-17α,21-diol-2,11,20-trione. |
| 21-acetate of 10α-acetonyl-6α,16α-dimethyl-19-nor-5α-pregnane-11β,17α,21-triol-2,20-dione. | 185 | 21-acetate of 10α-acetonyl-6α,16α-dimethyl-19-nor-5α-pregnane-17α,21-diol-2,11,20-trione. |
| 21-acetate of 10α-acetonyl-6α,16β-dimethyl-19-nor-5α-pregnane-11β,17α,21-triol-2,20-dione. | 186 | 21-acetate of 10α-acetonyl-6α,16β-dimethyl-19-nor-5α-pregnane-17α,21-diol-2,11,20-trione. |
| 21-acetate of 10α-acetonyl-16β-methyl-19-nor-5α-pregnane-11β,17α,21-triol-2,20-dione. | 187 | 21-acetate of 10α-acetonyl-16β-methyl-19-nor-5α-pregnane-17α,21-diol-2,11,20-trione. |
| 21-acetate of 10α-acetonyl-19-nor-5α-pregnane-11β,17α,21-triol-2,20-dione. | 188 | 21-acetate of 10α-acetonyl-19-nor-5α-pregnane-17α,21-diol-2,11,20-trione. |
| 21-acetate of 10α-acetonyl-16α-methyl-19-nor-5α-pregnane-11β,17α,21-triol-2,20-dione. | 189 | 21-acetate of 10α-acetonyl-16α-methyl-19-nor-5α-pregnane-17α,21-diol-2,11,20-trione. |
| 21-acetate of 10α-acetonyl-6α-methyl-19-nor-5α-pregnane-11β,17α,21-triol-2,20-dione. | 190 | 21-acetate of 10α-acetonyl-6α-methyl-19-nor-5α-pregnane-17α,21-diol-2,11,20-trione. |
| 21-acetate of 10α-(β-cyanoethyl)-6α,16α-dimethyl-19-nor-5α-pregnane-11β,17α,21-triol-2,20-dione. | 191 | 21-acetate of 10α-(β-cyanoethyl)-6α,16α-dimethyl-19-nor-5α-pregnane-17α,21-diol-2,11,20-trione. |
| 21-acetate of 10α-(β-cyanoethyl)-6α,16β-dimethyl-19-nor-5α-pregnane-11β,17α,21-triol-2,20-dione. | 192 | 21-acetate of 10α-(β-cyanoethyl)-6α,16β-dimethyl-19-nor-5α-pregnane-17α,21-diol-2,11,20-trione. |
| 21-acetate of 10α-(β-cyanoethyl)-16β-methyl-19-nor-5α-pregnane-11β,17α,21-triol-2,20-dione. | 193 | 21-acetate of 10α-(β-cyanoethyl)-16β-methyl-19-nor-5α-pregnane-17α,21-diol-2,11,20-trione. |
| 21-acetate of 10α-(β-cyanoethyl)-19-nor-5α-pregnane-11β,17α,21-triol-2,20-dione. | 194 | 21-acetate of 10α-(β-cyanoethyl)-19-nor-5α-pregnane-17α,21-diol-2,11,20-trione. |
| 21-acetate of 10α-(β-cyanoethyl)-16α-methyl-19-nor-5α-pregnane-11β,17α,21-triol-2,20-dione. | 195 | 21-acetate of 10α-(β-cyanoethyl)-16α-methyl-19-nor-5α-pregnane-17α,21-diol-2,11,20-trione. |
| 21-acetate of 10α-(β-cyanoethyl)-6α-methyl-19-nor-5α-pregnane-11β,17α,21-triol-2,20-dione. | 196 | 21-acetate of 10α-(β-cyanoethyl)-6α-methyl-19-nor-5α-pregnane-17α,21-diol-2,11,20-trione. |

The same oxidation technique was applied to the 10β-isomeric compounds of the products set forth under I, to obtain the corresponding 2,11,20-triketo-10β-isomeric compounds of the products listed under II.

*Example XVIII*

The 10α and 10β-susbstituted C-11-hydroxy-steroidal C-21-propionates, C-21-caproates and C-21-cyclopentylpropionates (obtained according to the method of Example X or Example XV) were oxidized in an identical manner, to produce the corresponding 10α or 10β-substituted 2,11,20-triketo steroidal compounds.

*Example XIX*

A solution of 5 g. of 6α,10α,16α-trimethyl-19-nor-5α-pregnane-17α,21-diol-2,20-dione (Cpd. No. 85) in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus, there was obtained the crude 21-tosylate of 6α,10α,16α-trimethyl-19-nor-5α-pregnane-17α, 21-diol-2,20-dione.

A solution of 2.5 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 6α,10α,16α-trimethyl-19-nor-5α-pregnane-17α-ol-2,20-dione (Cpd. No. 197).

Upon applying the same techinque to the 10β-isomer of the starting compound of this Example, there was obtained the corresponding 10β-substituted 21-desoxy-steroidal derivative.

*Example XX*

Following the two procedures of Example XIX, there were treated the 10α-substituted-11-desoxy-17α,21-dihydroxy-steroidal compounds Nos. 86 to 150, inclusive, (prepared according to Example VII) to give the corresponding 10α-substituted-11-desoxy-17β-monohydroxy-steroidal derivatives.

In the same manner there was applied the techinque to the corresponding 10β-substituted-11-desoxy-17α,21-dihydroxy-steroidal isomeric compound previously indicated, to obtain the respective 10α-substituted-11-desoxy-17-monohydroxy-steroidal derivatives.

*Example XXI*

There was applied the esterification techinque mentioned in Example XI, to 6α,10α,16α-trimethyl-19-nor-5α-pregnan-17α-ol-2,20-dione (Cpd. No. 197) to obtain the corresponding acetate of 6α,10α,16α-trimethyl-19-nor-5α-pregnan-17-ol-2,20-dione (Cpd. No. 198).

There was treated in a similar manner the corresponding 10β-substituted isomer of Cpd. No. 197, to produce the respective 10β-substituted steroidal acetate.

*Example XXII*

The 11-desoxy-17-monohydroxy-10α-substituted-2,20-diketo-steroidal derivatives, (obtained according to the method of Example XX) were esterified following the technique of Example XI, to give the corresponding 11-desoxy-17α-acetoxy-10α-substituted-2,20-diketo steroidal derivatives.

In the same manner there were treated the corresponding 10β-substituted isomers of the respective 17α-monohydroxy-2,20-diketo steroidal compound, to give the corresponding 17-acetate.

*Example XXIII*

The 10α or 10β-substituted-11-desoxy-17α-monohydroxy-steroidal compounds, set forth in Examples XXI and XXII, were treated following the esterification technique of Example XI, except that acetic anhydride was substituted by propionic anhydride, caproic anhydride and cyclopentylpropionic anhydride to produce the corresponding steroidal C-17-propionates, C-17-caproates and C-17-cyclopentylpropionates of the aforesaid compounds.

*Example XXIV*

2 g. of compound No. 160 was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 6α,10α,16α-trimethyl-19-nor-5α-pregnane-17α,21-diol-2,11,20-trione (Cpd. No. 198).

The compounds Nos. 161 to 196, inclusive, were treated by the same procedure, to give the corresponding 21-free hydroxy compounds.

I claim:
1. A compound of the following formula:

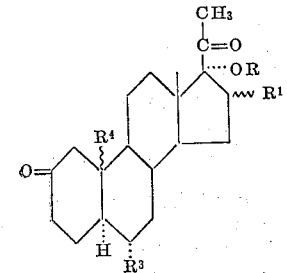

wherein R is selected from the group consisting of a hydrogen and a hydrocarbon carboxylic acyl group of less than 12 carbon atoms; R¹ is selected from the group consisting of hydrogen, α-methyl and β-methyl; R³ is a member of a group consisting of hydrogen and methyl; R⁴ is selected from the group consisting of methyl, cyano, dicarbethoxymethyl, ethinyl, acetonyl and β-cyanoethyl.

2. A compound of the following formula:

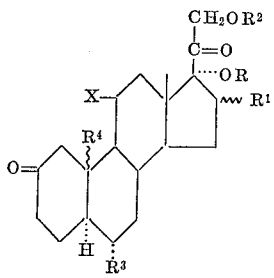

wherein R and R² are selected from the group consisting of hydrogen and a hydrocarbon carboxylic acyl group of less than 12 carbon atoms; R¹ is a member of the group consisting of hydrogen, α-methyl and β-methyl; R³ is sclected from the group consisting of hydrogen and methyl; X is a member of the group consisting of hydrogen, a keto group and a β-hydroxy group; and R⁴ is selected from the group consisting of methyl, cyano, dicarbethoxymethyl, ethinyl, acetonyl and β-cyanoethyl.

3. 10α-methyl - 19 - nor-5α-pregnane-11β,17α,21-triol-2,20-dione.

4. 10α - cyano-19-nor-5α-pregnane - 11β,17α,21 - triol-2,20-dione.

5. 10α - dicarbethoxymethyl - 19 - nor - 5α - pregnane-11β,17α,21-triol-2,20-dione.

6. 10α - ethinyl-19-nor-5α-pregnane-11β,17α,21 - triol-2,20-dione.

7. 10α - acetonyl-19-nor-5α-pregnane-11β,17α,21-triol-2,20-dione.

8. 10α - (β-cyanoethyl)-19-nor-5α-pregnane - 11β,17α,21-triol-2,20-dione.

9. 6α,10α,16α - trimethyl-19-nor-5α-pregnane-17α-ol-2,20-dione.

10. 10α,16α - dimethyl-19-nor-5α-pregnane-11β,17α,21-triol-2,20-dione.

11. 10α - cyano - 16α-methyl-19-nor-5α-pregnane-11β,17α,21-triol-2,20-dione.

12. 10α - dicarbethoxymethyl-19-nor-5α-pregnane-11β,17α,21-triol-2,20-dione.

13. 10α - ethinyl-19-nor-5α-pregnane-11β,17α,21-triol-2,20-dione.

14. 10α - acetonyl-19-nor-5α-pregnane-11β,17α,21-triol-2,20-dione.

15. 10α - (β-cyanoethyl)-19-nor-5α-pregnane-11β,17α,21-triol-2,20-dione.

16. 6α,10α,16α - trimethyl-19-nor-5α-pregnane-17α,21-diol-2,11,20-trione.

17. 6α,10α,16α - trimethyl-19-nor-5α-pregnane-11β,17α,21-triol-2,20-dione.

18. 10α - cyano - 6α,16α-dimethyl-19-nor-5α-pregnane-11β,17α,21-triol-2,20-dione.

19. 10α - dicarbethoxymethyl - 6α,16α-dimethyl-19-nor-5α-pregnane-11β,17α,21-triol-2,20-dione.

20. 10α - ethinyl - 6α,16α-dimethyl-19-nor-5α-pregnane-11β,17α,21-triol-2,20-dione.

21. 10α - acetonyl - 6α,16α - dimethyl-19-nor-5α-pregnane-11β,17α,21-triol-2,20-dione.

22. 10α - (β-cyanoethyl) - 6α,16α-dimethyl-19-nor-5α-pregnane-11β,17α,21-triol-2,20-dione.

No references cited.

LEWIS GOTTS, *Primary Examiner.*